June 18, 1946.  D. M. LAWRENCE  2,402,500
PRESSURE REGULATING DEVICE
Filed June 28, 1944   2 Sheets-Sheet 1
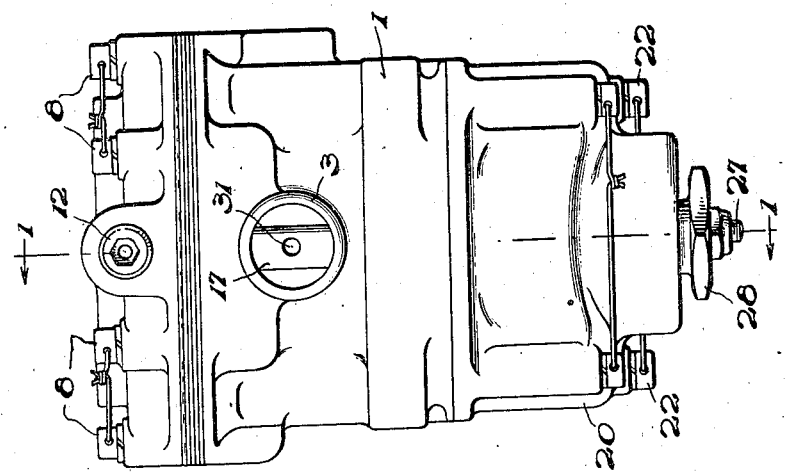
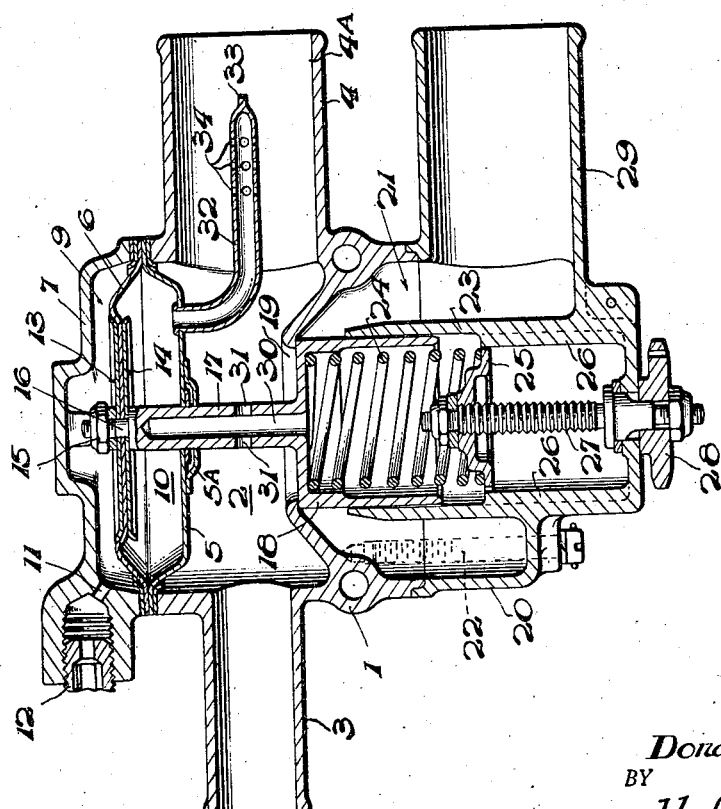
INVENTOR.
Donald M. Lawrence
BY
Herbert L. Davis, Jr.
ATTORNEY June 18, 1946.　　D. M. LAWRENCE　　2,402,500
PRESSURE REGULATING DEVICE
Filed June 28, 1944　　2 Sheets-Sheet 2

INVENTOR
Donald M. Lawrence
BY
Herbert L. Davis, Jr.
ATTORNEY

Patented June 18, 1946

2,402,500

UNITED STATES PATENT OFFICE 2,402,500

PRESSURE-REGULATING DEVICE

Donald M. Lawrence, Newark, N. J., assignor to Bendix Aviation Corporation, Teterboro, N. J., a corporation of Delaware Application June 28, 1944, Serial No. 542,551

1 Claim. (Cl. 137—153)

My present application is a continuation in part of my co-pending application Serial No. 422,601, filed December 11, 1941, and relates to improved pressure regulating devices, and more particularly to an improved device for maintaining a predetermined pressure differential for the operation of air-driven instruments in a system for an aircraft, such as disclosed in my above-noted co-pending application.

Many instruments, such as the directional gyro, gyro horizon, and turn indicator, are air-driven, and it is common to induce atmospheric air into the casing of each of these instruments directed at the conventional buckets carried on the rim of the gyro rotor and to exhaust the air at a definite suction pressure, so that the gyros may be spun with sufficient speed to carry out their different indicating or control functions. Suction is usually applied to the exhaust of the casing by means of a vacuum pump, which is usually driven directly from the engine. A regulating valve to damp out fluctuations in the suction line pressure is normally applied to a suction manifold, to which each of the different air-driven instruments of the airplane is connected. The vacuum pump exhausts to the atmosphere.

It has been common to draw the air for driving the different gyroscope rotors from outside the aircraft and to maintain sufficient suction, that is, a minimum pressure differential between the external atmosphere and the pump input. Due to the low air pressures obtaining at high altitudes, a positive displacement type of engine-driven pump, which is the type ordinarily used, is limited to the displacement of a lesser weight of air per unit volume than it displaces at sea level. It will, therefore, be apparent that with increasing altitudes, the conventional system will have difficulty in maintaining the required pressure differential for driving the gyroscopic rotors at constant speed.

It is an object of the present invention to provide a pressure differential regulating device for a system such as shown in my above-noted co-pending application, wherein the minimum pressure differential may be obtained regardless of the altitude of the system.

It is a further object of the invention to provide a minimum pressure differential regulating device for use in conjunction with supercharged aircraft cabins, wherein, at increasing altitudes, the load on the suction or vacuum pump may be relieved.

Other objects include the provision of a pressure differential regulator device adapted for use in a system wherein air at superatmospheric pressure is drawn through the casing of gyro instruments by a suction pump through a suction line, the regulating device having a novel means for relieving the load on the suction pump at high altitudes, and also providing means whereby the suction line from an instrument casing in a supercharged cabin may be exhausted to the atmosphere under certain regulated conditions for decreasing the load on the suction pump.

Another object of my invention is to provide a novel tubular means projecting longitudinally into the pump suction line from the differential pressure responsive device for more accurately reflecting changing flow conditions in the pump suction line so as to effect a more efficient control of the regulating device.

Another object of my invention is to provide novel means for anticipating changes to be effective on the instrument suction line through pressure changes in the pump suction line.

Further objects will appear from a study of the following specification when made in conjunction with the attached drawings, throughout which like numerals designate like parts.

In the drawings,

Figure 1 is a sectional view of my novel pressure regulating device taken along the lines 1—1 of Figure 2.

Figure 2 is an end view of the pressure regulating device of Figure 1.

Figure 3:
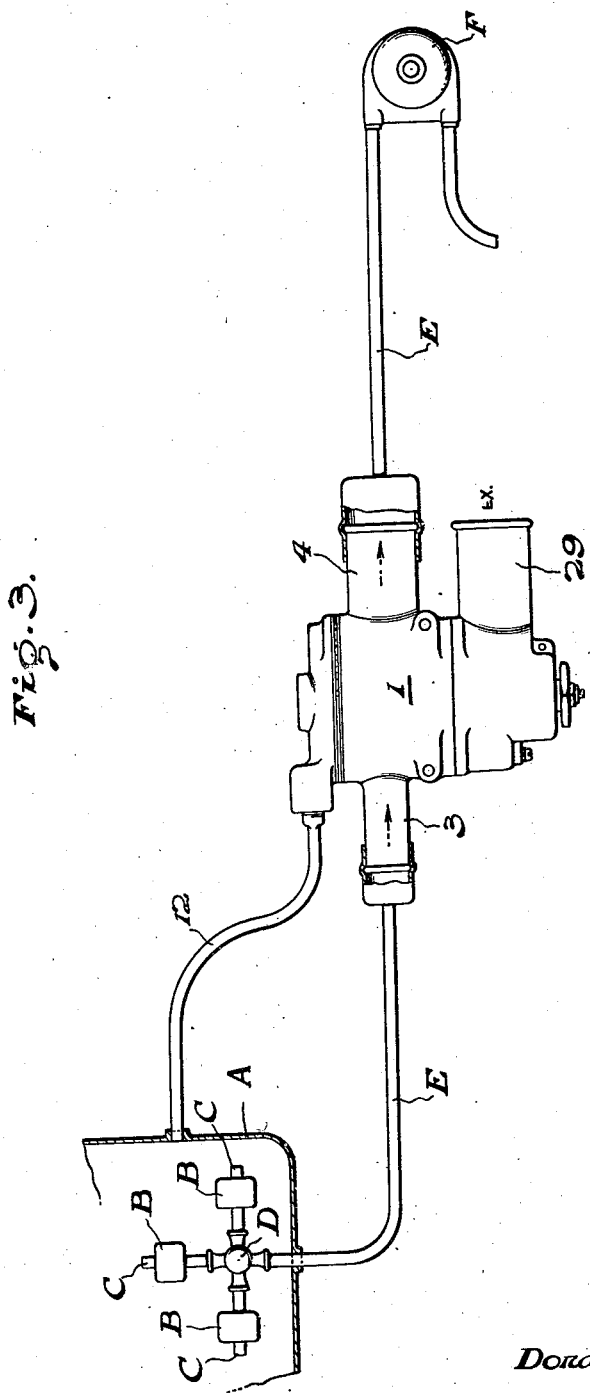
Figure 3 is a schematic showing of a system in which the present invention is shown in operative relation.

Referring to the drawing of Figure 3 letter A indicates a supercharged aircraft cabin containing a plurality of air-driven instruments B which instruments may for example be a rate of turn gyro, a directional gyro and an artificial horizon. Each of these instruments may have an air intake port C, which is open to cabin pressure, and their exhausts may be connected to a suction regulating valve D, which may be of the type shown in the Gregg Patent No. 2,194,749. Valve D connects to a suction or instrument line E connected to a suction pump F. The suction line E contains intermediate its ends a novel regulating valve assembly. The system is described in detail and claimed in my copending application Serial No. 422,601 filed December 11, 1941, while the novel regulating valve forms the subject matter of the present application.

The novel regulating valve includes as shown in Figure 1 a housing or casting indicated by the numeral 1 having formed therein a chamber 2 into which opens an input passageway 3 and an output passageway 4. The passageway 3 normally connects to the suction line E leading to the instruments within the cabin, previously noted, while the passageway 4 is normally connected to the input of the suction pump. The passageway 4 is in constant communication with the passageway 3, through the chamber 2.

The upper head portion of casting 1 is closed by a recessed plate 5, having a flexible diaphragm 6 extending across the recessed portion thereof. The plate 5 and diaphragm 6 are held in position between a cap 7 which is affixed to the head portion of casting 1 by bolts 8.

There is thus formed between the inner surface of cap 7 and the diaphragm 6 a chamber 9 and between the diaphragm 6 and recessed plate 5 a chamber 10. A passageway 11 is formed in the cap 7 leading into the chamber 9 and is normally connected to a conduit 12 leading to the interior of the aircraft cabin so that the pressure of the pressurized cabin will act in the chamber 9 upon the diaphragm 6.

Positioned at opposite sides of the diaphragm 6 are plates 13 and 14 fastened to the diaphragm 6 by a nut 15 screw threadedly engaged on a bolt 16 which projects through the plates 13 and 14 from one end of a stem 17.

The stem 17 projects through the plate 5 in slidable relation therewith. There are provided suitable sealing members 5A affixed to the plate 5 and about the stem 17 to prevent leakage between the chambers 2 and 10.

The stem 17 has formed integral therewith at the opposite side a cylindrical gate valve 18 which controls a valve opening or port 19 leading from the chamber 2 into a recessed portion of the casting 1. Closing the recessed portion of the casting 1 is a recessed casting 20 cooperating therewith to form a chamber 21. The casting 20 is affixed to the casting 1 by suitable bolts 22.

Formed in the casting 20 is a sleeve 23 in which is slidably mounted the cylindrical gate valve 18. A helical spring 24 acts at one end upon the cylindrical gate valve 18 biasing the same in a direction for normally closing the valve opening 19.

The helical spring 24 is supported at its opposite end by a plate 25 which is locked against rotary movement by splines 26. The plate 25 may be adjusted rectilinearly by rotation of a screw 27 which is screw threadedly engaged in the member 25. The screw 27 is conveniently connected to an adjustment member 28 mounted exteriorly of the casting 21, whereby the tension of the spring 24 may be readily adjusted for calibration purposes.

The chamber 21 has leading therefrom a passageway 29 formed in the casting 20 and normally connected to the atmosphere.

The stem 17 has formed therein a channel 30 leading from the interior of the cylindrical gate valve 18 and opening through ports 31 into the chamber 2, whereby the pressure within the interior of the cylindrical gate valve 18 is substantially equal to the pressure within the chamber 2.

There is further provided a curved tubular member or finger 32 which opens at one end into the interior of the chamber 10 and is affixed in any suitable manner to the plate 5. The tubular finger 32 extends from the plate 5 and is curved so as to project longitudinally into the passageway 4.

The finger 32 has the longitudinal end thereof 33 closed in a substantial conical point, while openings 34 are formed in the side thereof and subject to the negative pressure in the passageway 4, or suction force created by the flow of fluid medium through the passageway 4. As shown in Figure 1, the finger 32 is positioned concentric to the passageway 4 and in spaced relation to the inner surface of the passageway 4. The finger 32 extends in the direction of flow of the fluid medium through the passageway 4.

The openings 34 in the tubular finger 32 are positioned in the passageway 4 a sufficient distance from the chamber 2, as to be unaffected by any turbulence created in the chamber 2 due to the opening of the port 19. The finger 32 therefore senses changes in the negative pressure in the line created by the suction force resulting from the flow of fluid medium through the passageway 4. Moreover, since the same projects into the pump suction connection, the same anticipates changes to be made in the suction line connected to the passageway 3 due to variations in suction pump operation. In the operation of the device, the passageway 3 is connected by a suitable conduit to the air driven instruments such as a rate of turn gyro, a directional gyro or an artificial horizon indicator mounted in a supercharged aircraft cabin and having an air intake port open to cabin pressure, as described in my co-pending application Serial No. 422,601, filed December 11, 1941.

A suction pump is connected through a suitable suction line to the passageway 4, whereby air at sub atmospheric pressure is drawn through the chamber 2, passageway 3, and air intake ports of the air-driven instruments mounted in the supercharged aircraft cabin.

However, in order to maintain a substantially minimum constant differential pressure between the pressure in the instrument suction line connected to the passageway 3 and the pressure in the supercharged aircraft cabin, a valve 18 is provided whereby the suction line from the instrument casing may be exhausted to the atmosphere under certain regulated conditions. The valve serves the further purpose of decreasing the load on the suction pump as the atmospheric pressures decrease upon rise in altitude. Thus upon maintaining a constant cabin pressure greater than surrounding atmospheric pressure at the high altitudes, the decrease in atmospheric pressure may be utilized through operation of the unloading valve 18 to maintain the suction line at a predetermined minimum constant differential below the supercharged cabin pressure in such a manner that the load on the pump and the corresponding power requirements may be decreased materially. Thus a pump which may serve as a source of suction at the lower altitudes may through the operation of my novel unloading valve be gradually relieved of work as the altitude increases so that the power required to drive the suction pump at high altitudes may decrease to practically zero.

In order to maintain the predetermined differential between supercharged cabin and line pressure (such as a pressure differential of six inches of mercury) the diaphragm 6 has cabin pressure applied through conduit 12 and port 11 to the chamber 9, and a pressure indicative of line pressure applied at the chamber 10. The diaphragm 6 is arranged to operate the valve 18 in response to a predetermined differential between the pressures applied in chambers 9 and 10. Thus as the supercharged cabin pressure in the chamber 9 increases over the pressure in the chamber 10 the diaphragm 6 is biased by such cabin pressure against the tension of the spring 24 so as to cause the sleeve valve 18 to open the valve port 19. This predetermined differential may be conveniently adjusted by varying the tension of the spring 24 through adjustment of the member 28.

In order to obtain a measure of the valve of the pressure in the suction line free of the turbulence and inaccuracies introduced upon opening of the sleeve valve 18 the measurement of the pressure in the suction line is taken at a point other than in the chamber 2. Moreover, in order to anticipate changes which may be caused in such pressure through variations in the suction pump operation, I have found the point for most effective measurement to be in the passageway 4 rather than in the passageway 3 and at a point an appreciable distance from the chamber 2.

In order to effect this measurement so as to produce an anticipating effect on the valve 18, I have provided the tubular finger 32 which opens at one end into the chamber 4.

The tubular finger 32 as explained extends from the plate 5 and is curved so as to project longitudinally into the passageway 4 extending in spaced relation to the inner surface 4A. Through the openings 34, a negative or suction pressure is exerted through the tubular finger 32 on the chamber 10. This pressure represents not the actual pressure in the instrument suction line 3 but rather an indication of what such pressure may be unless adjustment of the valve 18 is effected to correct for variations in atmospheric pressure or pump operation. Thus when such anticipated line pressure approaches a maximum predetermined pressure differential below supercharged cabin pressure, the diaphragm 6 is biased by the cabin pressure so as to open the valve 18 permitting an unloading of the pump to atmosphere through the passageway 29. The opening of the valve 18 causes the pressure within the suction line to increase so as to approach atmospheric pressure until the suction line pressure and cabin pressure once again are within the predetermined differential pressure range.

From the foregoing it will be readily seen that by means of my novel tubular finger or sensing device 32, an anticipating effect is produced on the regulating device 6, whereby a corrective regulation of the unloading valve 19 is effected before an adverse change takes place in the instrument suction line, and thus providing a more accurate regulation of the suction line unloading valve.

While only one embodiment of the present invention has been shown in the drawings, it is to be understood that various changes may be made without departing from the scope of the present invention. For this reason, it is intended not to limit the invention by the description herein given as an example, but solely by the scope of the appended claim.

What is claimed is:

In a suction relief valve, the combination of a body having a chamber and a plurality of means adapted to operatively connect the chamber with suction and with a respective line in which the suction is to be regulated, the arrangement being such that the chamber acts as conduit means for continuously connecting each of said means together, said body also having port means disposed on one side of the chamber conduit means for relieving suction in the chamber by admitting flow of air from the atmosphere through said port means, a valve constructed to cooperate with the relief port means to throttle the flow of air through said port means, said valve being of the piston-poppet type arranged to have one side subjected to the pressure in the chamber and provided with a connection through the piston to introduce an equalizing pressure to its other side, a spring on the same side of the chamber conduit means as the valve and connected with the valve to bias the valve in the direction to decrease the effective opening of said port means, a tube having one end located away from the wall of the suction connecting means and constructed to transmit the pressure within the last-mentioned means to the other end of said tube, and means on the other side of the chamber conduit means adapted to be sensitive to the difference between the pressure within said tube and a higher reference pressure and connected to the valve to tend to increase the effective opening of said port means upon an increase of said difference.

DONALD M. LAWRENCE.